United States Patent

Henderson et al.

[11] Patent Number: 5,943,466
[45] Date of Patent: Aug. 24, 1999

[54] FREQUENCY AND AMPLITUDE MODULATED FIBER SPINS FOR PMD REDUCTION

[75] Inventors: Danny L. Henderson, Wilmington, N.C.; Ming-Jun Li, Horseheads; Daniel A. Nolan, Corning, both of N.Y.; Glenda R. Washburn, Rocky Point, N.C.

[73] Assignee: Corning Incorporated, Corning, N.Y.

[21] Appl. No.: 08/784,574

[22] Filed: Jan. 21, 1997

Related U.S. Application Data

[60] Provisional application No. 60/010,376, Jan. 22, 1996.

[51] Int. Cl.$^6$ .................................................. G02B 6/02
[52] U.S. Cl. ........................ 385/123; 385/124; 385/128; 65/402; 65/438
[58] Field of Search ................................. 385/123–128; 65/504, 438, 402, 390

[56] References Cited

U.S. PATENT DOCUMENTS

| | | | |
|---|---|---|---|
| 4,248,035 | 2/1981 | Skillen et al. | 385/100 X |
| 4,308,045 | 12/1981 | Miller | 65/403 |
| 4,509,968 | 4/1985 | Arditty et al. | 65/500 |
| 5,298,047 | 3/1994 | Hart, Jr. et al. | 65/432 |
| 5,418,881 | 5/1995 | Hart, Jr. et al. | 385/123 |
| 5,704,960 | 1/1998 | Evans et al. | 65/402 |
| 5,822,487 | 10/1998 | Evans et al. | 385/123 |

FOREIGN PATENT DOCUMENTS

| | | |
|---|---|---|
| 2359087 | of 0000 | France . |
| 2555337 | of 0000 | Germany . |
| 3022088 | of 0000 | Germany . |

OTHER PUBLICATIONS

H. Schneider et al., "Low–birefringence single–mode optical fibers: preparation and polarization characteristics", Applied Optics, 1978, vol. 17, No. 19, pp. 3035–3037.

MJ Marrone et al., "Internal rotation of the birefringence axes in polarization–holding fibers", Optics Letters, 1987, vol. 12, No. 1, pp. 60–62.

R. Ulrich et al., "Polarization optics of twisted single–mode fibers", Applied Optics, 1979, vol. 18, No. 13, pp. 2241–2251.

SC Rashleigh, "Fabrication of Circularly Birefringent Single Mode Fibers", Navy Technical Disclosure Bulletin, 1980, vol. 5, No. 12, pp. 7–12.

Primary Examiner—Phan T.H. Palmer
Attorney, Agent, or Firm—David L. Berdan

[57] ABSTRACT

The invention provides improved methods for reducing polarization mode dispersion (PMD) in single mode fiber by spinning the fiber during the drawing process in accordance with a spin function having sufficient harmonic content to achieve low levels of PMD for commercial fibers for which the beat lengths of the fibers, including the beat lengths of different portions of the fibers, are variable and thus not readily known in advance. The spin functions of the invention take advantage of certain resonances in energy transfer between polarization modes to achieve substantial reductions in PMD for a wide range of beat lengths. Examples of suitable spin functions include frequency-modulated and amplitude-modulated sine waves.

12 Claims, 12 Drawing Sheets

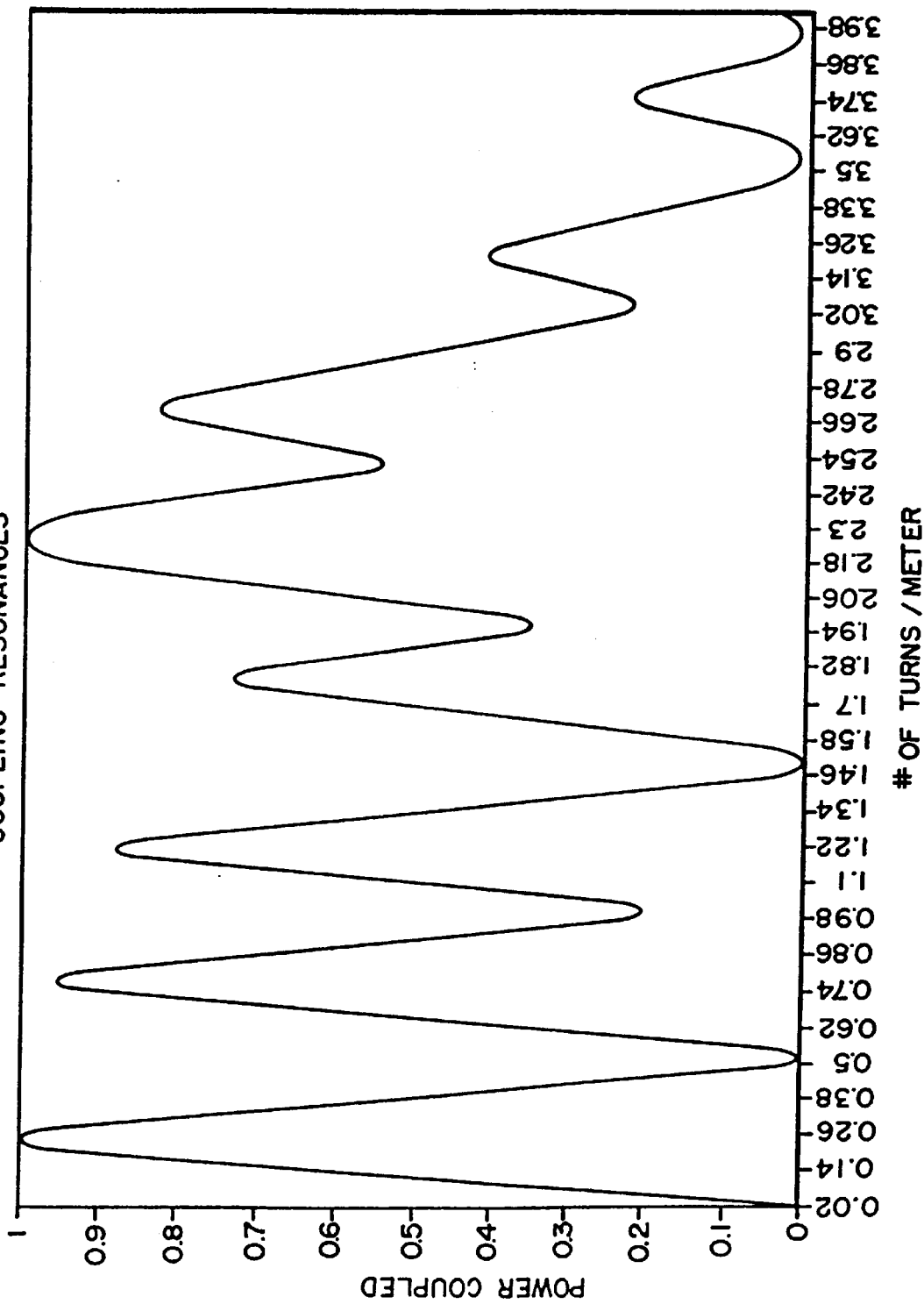

Frequency Modulated Profile

Frequency Spectrum

Square Profile

Frequency Spectrum

Triangular Profile

Frequency Spectrum

FREQUENCY AND AMPLITUDE MODULATED FIBER SPINS FOR PMD REDUCTION

CROSS REFERENCE TO RELATED PROVISIONAL APPLICATION

This application claims the benefit under 35 USC §119(e) of U.S. Provisional Application Ser. No. 60/010,376, filed Jan. 22, 1996.

BACKGROUND OF THE INVENTION

This invention relates to methods for reducing polarization mode dispersion (PMD) in single mode optical fiber. More particularly, it relates to reducing PMD over a broad band of fiber birefringence.

It is well known that the so-called "single mode fiber" that is commonly used in communication systems is not purely single mode. Rather, two modes, with perpendicular polarizations, exist in single mode fiber. See, for example, Dändliker, R., *Anisotropic and Nonlinear Optical Waveguides*, C. G. Someda and G. Stegeman (editors), Elsevier, N.Y., 39–76, 1992. Mathematically, these two polarizations form an orthogonal basis set. Accordingly, any configuration of light that propagates through a single mode fiber can be represented by a linear superposition of these two modes.

If the fiber is perfectly circularly symmetric in both geometry and internal and applied stress, the two polarization modes are degenerate. They propagate with the same group velocity and have no time delay difference after traveling the same distance in the fiber. However, a practical fiber is not perfectly circularly symmetric. Imperfections such as geometric and form deformation and stress asymmetry break the degeneracy of the two modes. See, for example, Rashleigh, S. C., *Journal of Lightwave Technology*, LT-1:312–331, 1983. As a result, the two polarization modes propagate with different propagation constants ($\beta_1$ and $\beta_2$). The difference between the propagation constants is termed birefringence ($\Delta\beta$), the magnitude of the birefringence being given by the difference in the propagation constants of the two orthogonal modes:

$$\Delta\beta = \beta_1 - \beta_2 \tag{1}$$

Birefringence causes the polarization state of light propagating in the fiber to evolve periodically along the length of the fiber. The distance required for the polarization to return to its original state is the fiber beat length ($L_b$), which is inversely proportional to the fiber birefringence. In particular, the beat length $L_b$ is given by:

$$L_b = 2\pi/\Delta\beta \tag{2}$$

Accordingly, fibers with more birefringence have shorter beat lengths and vice versa. Typical beat lengths observed in practice range from as short as 2–3 millimeters (a high birefringence fiber) to as long as 10–50 meters (a low birefringence fiber).

In addition to causing periodic changes in the polarization state of light traveling in a fiber, the presence of birefringence means that the two polarization modes travel at different group velocities, the difference increasing as the birefringence increases. The differential time delay between the two polarization modes is called polarization mode dispersion, or PMD. PMD causes signal distortion which is very harmful for high bit rate systems and analog communication systems.

Various attempts to reduce PMD have been made. One prior art method of reducing PMD involves spinning the preform during the fiber drawing process. See, for example, Barlow, et al., *Applied Optics*, 20:2962–2968, 1981; Payne, et al., *IEEE Journal of Quantum Electronics*, QE-18:477–487, 1982; Rashleigh, "Fabrication of Circularly Birefringent Single Mode Fibers," *Navy Technical Disclosure Bulletin* 5:7–12, 1980; and PCT Patent Publication No. WO 83/00232. The spinning causes the internal geometric and/or stress asymmetries of the fiber to rotate about the fiber's axis as one progresses down that axis. By performing the spinning during drawing, i.e., when the root of the preform is substantially molten, essentially pure rotation is performed on the fiber asymmetries, as opposed to a combination of rotation of the asymmetries and the introduction of rotational stress as would occur if the fiber were twisted after having been drawn. For a discussion of the use of twist to reduce PMD see, for example, Schuh et al., *Electronics Letters*, 31:1172–1173, 1995; and Ulrich, et al., *Applied Optics*, 18:2241–2251, 1979.

The reduction in PMD produced by spinning is proportional to the spin rate. Unfortunately, very high spin rates are generally required to deal with the asymmetries of typical fibers, e.g., spin rates greater than 5000 rpm. Spinning a preform at such rates is not a practical solution for commercial fiber production. Similarly, spinning the fiber, as opposed to the preform, at such high rates is also not particularly practical.

U.S. Pat. No. 5,298,047 (also U.S. Pat. No. 5,418,881) to Arthur C. Hart, Jr. et al. discusses reducing PMD by a relatively low rate spinning of a fiber, as opposed to a preform, during the drawing process. However, the Hart patent does not recognize that, under certain conditions, occurrences of maximal PMD reduction may be achieved. Because the Hart patent does not recognize or take advantage of these occurrences of maximal PMD reduction, the PMD reduction achieved by the method disclosed in the Hart patent is not as great as the PMD reduction achieved by the methods of the present invention.

More particularly, the Hart patent discloses a spin rate which varies in substantially a sinusoidal manner. That is, Hart's spin rate $\alpha$ as function of distance z along the length of Hart's fiber can be written:

$$\alpha(z) = \alpha_0 \sin(2\pi f z), \tag{3}$$

where $\alpha_0$ is Hart's spin amplitude in turns/meter and f is Hart's longitudinal frequency in inverse meters, i.e., f represents the rate at which Hart's spin rate a varies along the length of the fiber.

The term "spin function" will be used herein to describe spin rate as function of distance z, i.e., $\alpha(z)$, or as a function of time t, i.e., $\alpha(t)$, the time spin function applied to a fiber being directly derivable from the corresponding distance spin function through the fiber draw rate, which is normally constant but, in the general case, can be variable. As discussed more fully below, the spin function employed in producing a fiber, whether expressed as a function of distance or time, and the resulting spin function present in the finished fiber, expressed as a function of distance, are not in general identical because of, for example, mechanical effects, e.g., slippage, at the interface between the fiber and the apparatus used to apply the spin function to the fiber and/or preform.

Equation (3) above illustrates this difference in that the Hart patent describes its applied spin function as an oscillation, i.e., a pure sinusoid, at either 60 cycles/minute for a draw speed of 1.5 meters/second (curve 60 of Hart's FIG. 6) or 106 cycles/minute for a draw speed of 3.0 meters/second (curve 61 of Hart's FIG. 6), while the observed spin function in the fiber shown in Hart's FIG. 6 is only approximately sinusoidal. Significantly, with regard to the present invention, Hart's deviation from a pure sinusoid is not sufficient to achieve the reduced PMD disclosed herein.

In particular, in accordance with the present invention, it has been determined that a sinusoidal spin function is optimal for reducing PMD only for certain birefringence beat lengths, with the particular beat lengths for which optimization is achieved being a function of the $\alpha_0$ and f values of the sinusoidal spin function. For other beat lengths, a sinusoidal spin function is less than optimum and can be quite poor.

Commercial fibers exhibit a wide variety of beat lengths since the geometric and stress asymmetries of such fibers vary along the length of the fiber and between different fibers. Accordingly, the substantially sinusoidal spin function of the Hart patent at best can only provide optimum PMD reduction for some fibers and/or some sections of a particular fiber.

The present invention overcomes this deficit in the Hart patent. It does so by providing improved spin functions which are not substantially sinusoidal. By means of these spin functions, greater results in terms of PMD reduction are achieved than in prior art methods. As just one example, through the use of the methods of the invention, PMD values of less than 0.1 $ps/km^{1/2}$ can be achieved for a population of commercial fibers, e.g., a population comprising 100 fibers, where the members of the population, if unspun, would exhibit a range of beat lengths or alternatively, a range of PMD values, e.g., PMD values varying between fibers by as much as 1.0 $ps/km^{1/2}$ and varying within a given fiber by as much as 1.0 $ps/km^{1/2}$ for fibers having a length of at least 10 kilometers.

SUMMARY OF THE INVENTION

In view of the foregoing, it is an object of the present invention to provide improved methods for reducing PMD. More particularly, it is an object of the invention to provide methods for reducing PMD for fibers which exhibit more than one beat length either in a given fiber and/or between different fibers.

It is a further object of the invention to provide methods for reducing PMD which do not require rotation of a preform.

It is an additional object of the invention to provide methods for reducing PMD which do not involve excessively high spin rates, e.g., maximum spin rates (maximum amplitudes) of less than 10 turns/meter, preferably less than 4 turns/meter.

The invention achieves these and other objects by providing spin functions which are: (1) not substantially constant, i.e., they change substantially as a function of distance along the length of a fiber or as a function of time; (2) not substantially sinusoidal; and (3) have sufficient variability, e.g., sufficient harmonic content, to provide a substantial reduction in PMD for a plurality of beat lengths.

In the general case, the spin function can, for example, be constructed as a weighted sum of sinusoidal components of different frequencies, the number of components and their weights being chosen to produce an overall function which achieves the PMD reductions of the invention. The spin function can also be randomly generated. In certain preferred embodiments, the spin function is a frequency-modulated or an amplitude-modulated sinusoidal function, the modulation being sufficient to cause the spin function not to be substantially sinusoidal.

By means of the spin functions of the invention, the disadvantages and limitations of other methods of reducing PMD are overcome.

BRIEF DESCRIPTION OF THE DRAWINGS

The above and other objects and advantages of the invention will be apparent upon consideration of the following detailed description, taken in conjunction with the accompanying drawings, in which:

FIG. 8 shows the amount light which a spun section of FIG. 7 couples between the fast and slow axes of its adjoining unspun sections as a function of spin rate, i.e., it shows coupling resonances as a function of spin rate.

DETAILED DESCRIPTION OF THE INVENTION

Figure 1:
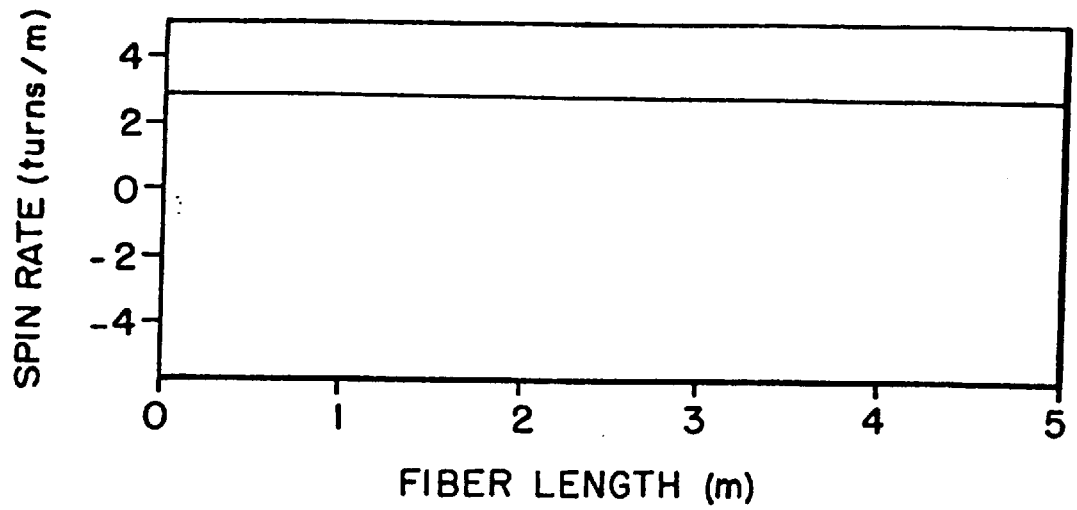
FIG. 1 is a diagram showing spin rate as a function of length when the spin function is a straight line.

The invention provides a method of reducing PMD by variably spinning a fiber during the drawing process. More specifically, this means heating a conventional fiber preform to a conventional draw temperature, and drawing optical fiber from the preform such that a spin is imparted on the fiber. Preferably, the method involves rotation of the fiber, as opposed to the preform. Alternatively, although not preferred, rotation of the preform, either instead of, or in combination with, rotation of the fiber, can be performed if desired.

While prior art methods also spin the fiber to reduce PMD, the spin functions of the prior art were either a straight line function, i.e., a constant spin rate, or a substantially sinusoidal spin function with a substantially constant frequency and a substantially constant amplitude for the sinusoidal function.

Figure 2:
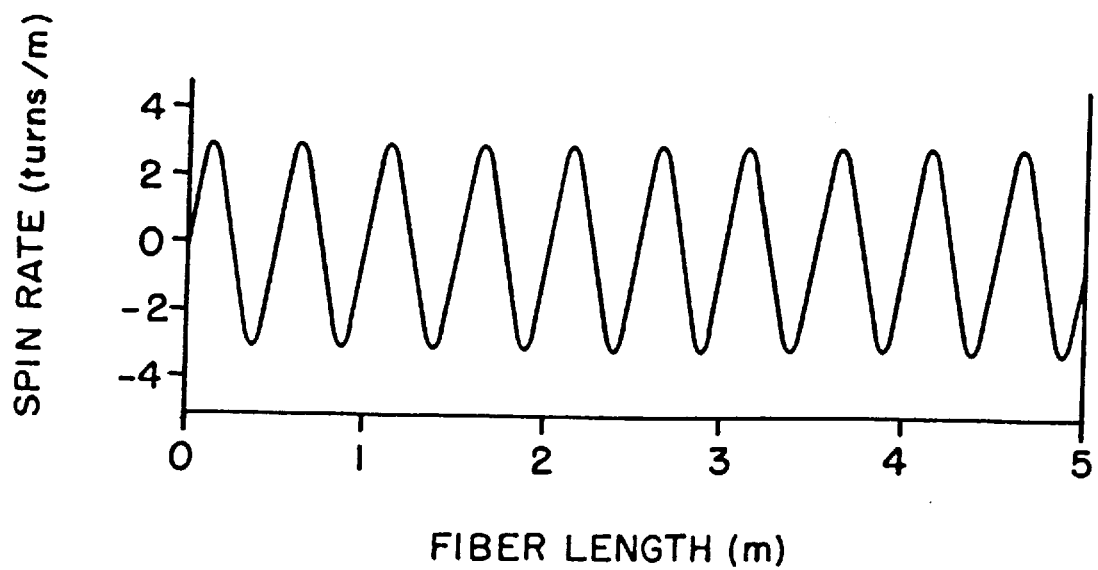
FIG. 2 is a diagram showing spin rate as a function of length when the spin function is a sinusoidal function having a constant amplitude and frequency.

FIG. 1 illustrates a straight line spin function used in prior art methods for reducing PMD. The spin function of FIG. 1 may be written as $\alpha = \alpha_0$, where $\alpha_0$ is the spin amplitude in turns/meter. FIG. 2 illustrates a sinusoidal type spin function used in prior art methods for reducing PMD. The spin function of FIG. 2 has a constant amplitude and frequency and may be written as $\alpha = \alpha_0 \sin(2\pi f z)$, where, as defined above, $\alpha_0$ is the spin amplitude in turns/meter, f is the longitudinal frequency in inverse meters, and z is the position in the fiber.

As discussed above, the spin functions of the present invention are different from those of the prior art in that they are not substantially sinusoidal and they have sufficient variability to provide a substantial reduction in PMD for a plurality of beat lengths.

Whether or not a particular spin function is "substantially sinusoidal" can be determined by performing a complex Fourier analysis of the spin function and comparing the magnitudes of the coefficients for the various components of the function determined thereby. The complex Fourier analysis is performed using conventional techniques well known in the art. For example, the analysis can be performed using commercially available software such as that sold by Wolfram Research, Inc., (Champaign, Ill.) under the MATHEMATICA trademark.

In accordance with the invention, a spin function is substantially sinusoidal when the magnitude of the coefficient for one of its oscillatory components (the fundamental component) dominates the magnitudes of the coefficients for all other oscillatory components (the secondary components) as well as the coefficient for any constant component. In quantitative terms, domination occurs when the magnitude of the coefficient for the fundamental component is at least about three times the magnitude of the coefficient for each of the secondary components and the coefficient of the constant component.

Figure 3:
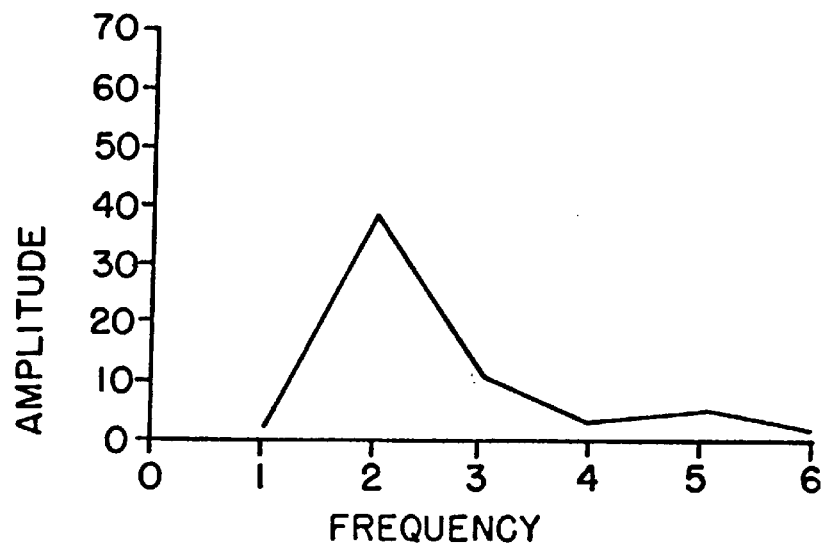
FIG. 3 shows the results of a complex Fourier analysis of the data points associated with curve 60 of FIG. 6 of the above-referenced Hart patent.
Figure 4:
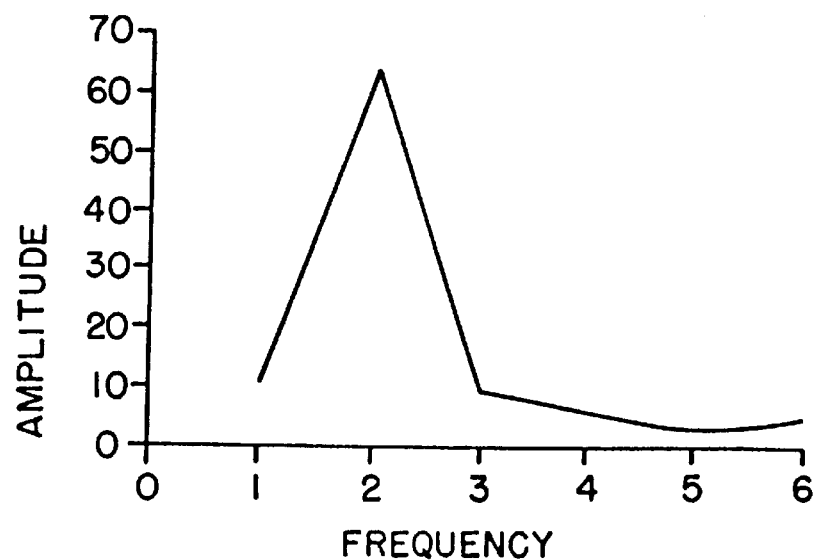
FIG. 4 shows the results of a complex Fourier analysis of the data points associated with curve 61 of FIG. 6 of the above-referenced Hart patent.
Figure 6:
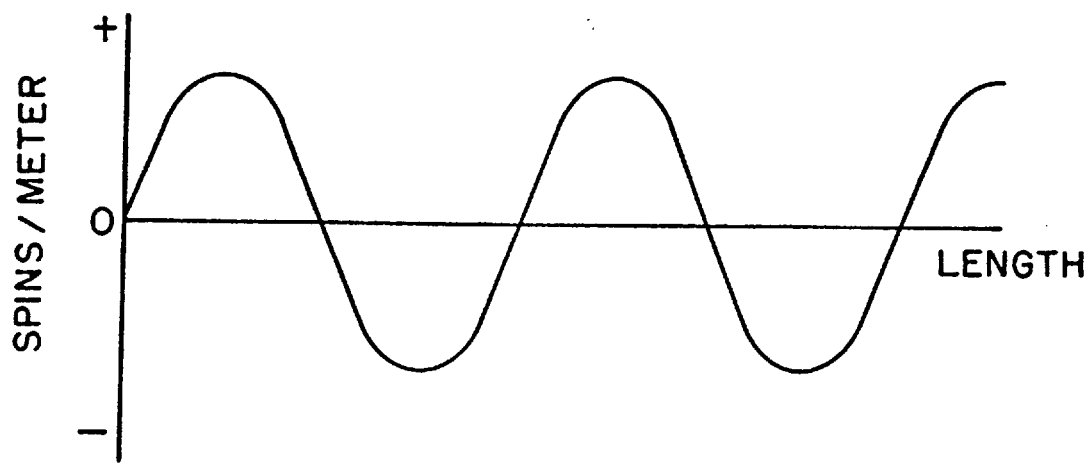
FIG. 6 shows a sinusoidal spin function.

FIG. 3 and FIG. 4 show the results of performing a complex Fourier analysis, specifically, a finite complex Fourier analysis, on the data points of curves 60 and 61 of FIG. 6 of the Hart patent using the above-referenced MATHEMATICA program. For this program, the constant coefficient is reported as frequency "1". The substantially sinusoidal nature of the Hart spin function is evident from these figures, the magnitude of the fundamental component (the "2" frequency) being at least three times the magnitudes of all other components for each set of data points.

The analysis of FIG. 3 and FIG. 4 was repeated using the fitted curves of Hart's FIG. 6, rather than the data points of that figure. The fitted curves were digitized and then analyzed using the MATHEMATICA program. In this case, the analysis showed even greater dominance of the fundamental oscillatory component, with the magnitude of the coefficient for that component being at least five times greater than the magnitudes of all other coefficients.

In addition to being non-sinusoidal, the spin functions of the invention must have sufficient variability to provide substantial reduction in PMD for a plurality of beat lengths. The variability of a spin function is most conveniently examined by determining the spin function's harmonic content, again by means of a complex Fourier analysis.

In accordance with the invention, it has been found that spinning alone, whether at a constant or sinusoidal spin rate, will not in general produce optimum reductions in PMD for commercial fibers. Rather, the spin rate should vary both in magnitude and spatial distribution along the length of the fiber to achieve an optimum reduction. When so varied, the spinning achieves transfer of energy between polarization modes (mode coupling) for a variety of beat lengths. Such energy transfer is highly effective in reducing PMD for commercial fibers.

In contrast to variable spinning, spinning at a constant rate, while it does result in a reduction of PMD, does so without transferring energy between polarization modes. Sinusoidal spinning or, more generally, low variability spinning, can achieve energy transfer between polarization modes. However, this energy transfer is highly dependent on beat length, being large for some beat lengths and small for others for a given amplitude and frequency of the sinusoidal spinning. As a result, the reduction in PMD exhibits resonances, with the reduction being strong only for certain beat lengths. As discussed above, commercial fibers exhibit a variety of beat lengths which may or may not match the PMD resonances of sinusoidal spinning. When the resonances are missed, sufficient reduction of PMD may not be achieved.

Figure 5:
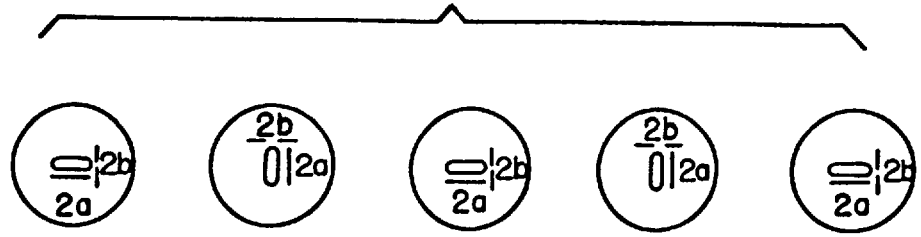
FIG. 5 shows a hypothetical fiber configuration which achieves maximum energy transfer between polarization modes.

FIGS. 5–8 illustrate these aspects of the invention. FIG. 5 shows a hypothetical fiber configuration which achieves maximum energy transfer between polarization modes. The figure shows cross-sections along the length of a polarization preserving fiber, specifically, a fiber with an elliptical core, where the fiber has been divided into sections of equal length, each section being rotated 90° from the preceding section.

The fast and slow modes for each section are along the short and long axes of the ellipse, respectively. Because each section has been cut and rotated by 90°, energy from the fast mode is coupled into the slow mode at each cut, and similarly energy from the slow mode is coupled into the fast mode. Accordingly, the mode dispersion for each section is exactly compensated for in the next section, resulting in essentially no PMD for the entire fiber. The effectiveness of energy transfer between polarization modes in reducing PMD is clear from this figure.

Figure 7:
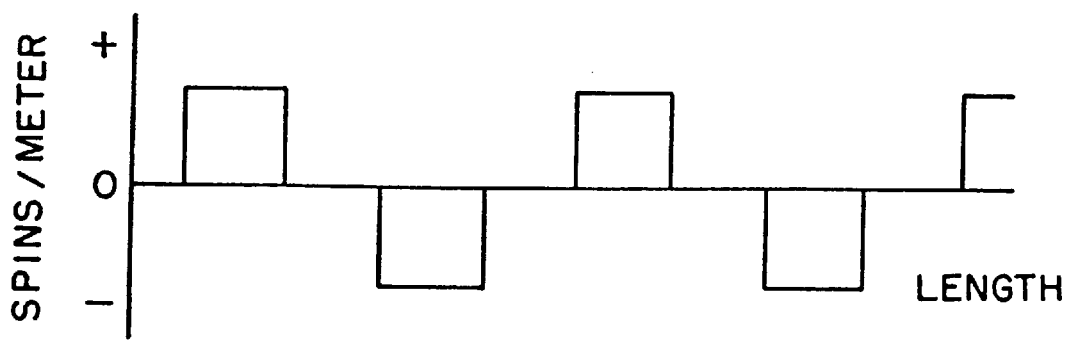
FIG. 7 shows an approximation to the sinusoidal spin function of FIG. 6.

The inability of a substantially sinusoidal spin function to achieve optimum PMD reductions for a plurality of beat lengths can be demonstrated with the aid of FIGS. 6 and 7, where FIG. 6 shows a sinusoidal spin function and FIG. 7 shows an approximation to such a function which provides for a simpler analysis. Specifically, in FIG. 7, the sinusoidal spin function is approximated by a series of unspun and spun sections, with the spun sections being of constant amplitude but alternating in spin direction.

The configuration of FIG. 7 can be analyzed to determine if the spun sections act like the cuts of FIG. 5, i.e., if they serve to transfer energy between the slow and fast polarization modes of the unspun sections. If such transfer occurs, the mode dispersion for each unspun section will be compensated for in the next unspun section. This, in turn, will give the fiber an overall small PMD since the unspun sections' contribution to the PMD is much greater than that of the spun sections and thus this contribution must be reduced if the overall PMD is to be reduced.

The system of FIG. 7 can be analyzed by means of a Jones matrix to calculate the amount of light in the linear polarization modes after light traverses an unspun section, followed by a section of constant spin, and then another unspun section. The appropriate Jones matrix is as follows:

$$J = \begin{vmatrix} a & -b^* \\ b & a^* \end{vmatrix} \quad (4)$$

where $$a = \cos(gd)\cos(\alpha d) + \alpha/g \sin(gd) + \quad (5)$$
$$j\Delta\beta_u/g \sin(gd)\cos(ad)$$

$$b = \cos(gd)\sin(\alpha d) - \alpha/g \sin(gd)\cos(ad) \quad (6)$$

$$g = \sqrt{\alpha^2 + \Delta\beta_u^2} \quad (7)$$

In these equations, a is the constant spin rate of the spun section in radians/meter and $\Delta\beta_u$ is the birefringence of the unspun fiber in radians/meter.

FIG. 8 shows the results of calculations performed using this Jones matrix. The figure shows the amount light which has coupled from the fast axis in a leading unspun section to the slow axis in a trailing unspun section after traversing a spun section. The calculations were performed for the spin rates shown in the figure for spun and unspun sections having a length of 1 meter and a beat length for the unspun fiber of 1 meter.

Because this figure shows coupling from fast axis to slow axis, a coupling ratio near 1 means that significant light has transferred from the fast mode to the slow mode. This, in turn, means that substantial compensation will be provided for the dispersions of the unspun sections and thus the overall PMD will be low. On the other hand, a coupling ratio near zero means that little light has transferred from the fast mode to the slow mode and thus compensation will be low and PMD high.

The resonant nature of the system is evident from FIG. 8. Only certain spin rates achieve the desired high coupling ratios for the chosen beat length and section dimensions. Significantly, those dispersion minimizing spin rates will be different for different beat lengths and/or different section dimensions. It is for this reason that a spin function must exhibit a high level of variability in order to be optimum for PMD reduction. Without such variability there can be no assurance that PMD reducing resonances will in fact occur for commercial fibers with their variable beat lengths, both within different portions of a fiber and between fibers.

FIGS. 9–12 show representative spin functions which do (FIGS. 9–10) and do not (FIGS. 11–12) achieve sufficient variability for use in accordance with the invention. Panel A of each figure shows the spin function, and panel B shows the results of a complex Fourier analysis of the function to determine its harmonic content. In particular, panel B shows normalized amplitudes for the various components where the normalization has been performed using the component with the largest amplitude.

Figure 9A:
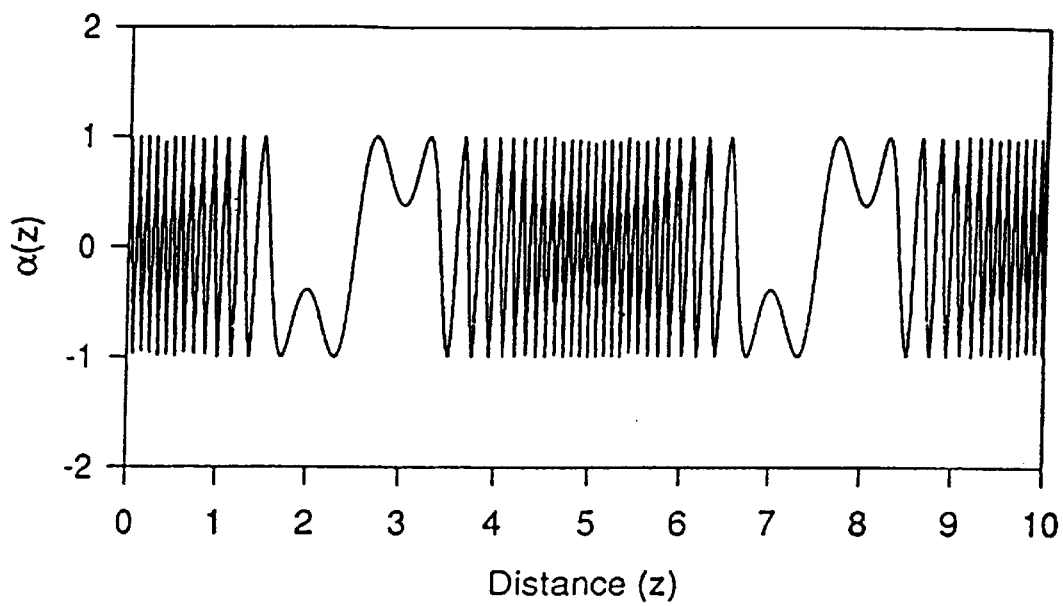
FIGS. 9–12 show representative spin functions which do (FIGS. 9–10) and do not (FIGS. 11–12) achieve sufficient variability for use in accordance with the invention. Panel A of each figure shows the spin function, and panel B shows the results of a complex Fourier analysis of the function to determine its harmonic content.
Figure 9B:
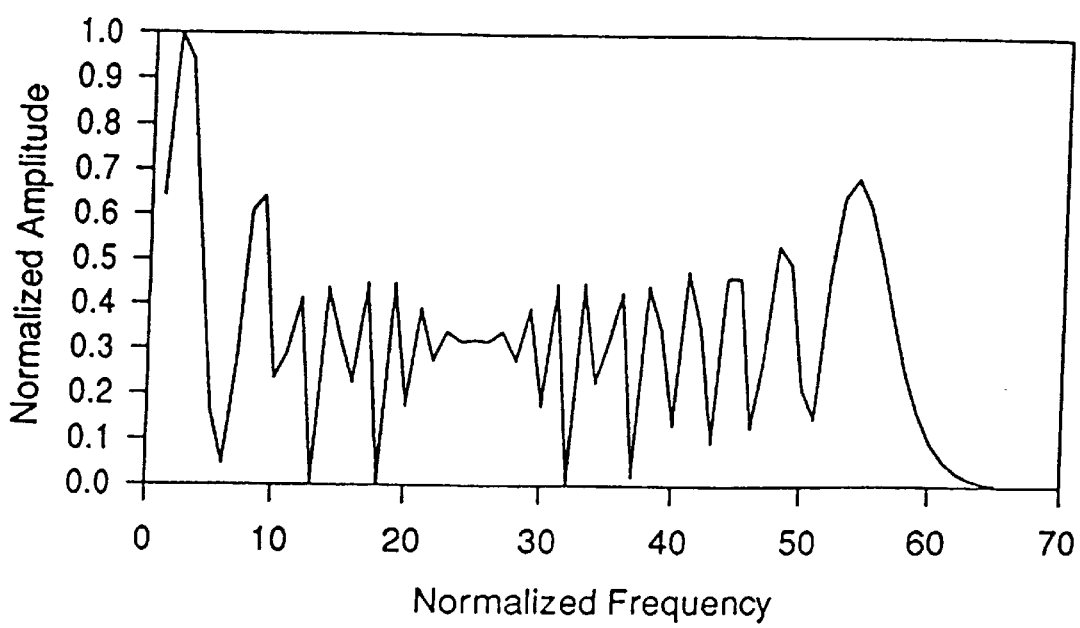
Figure 10A:
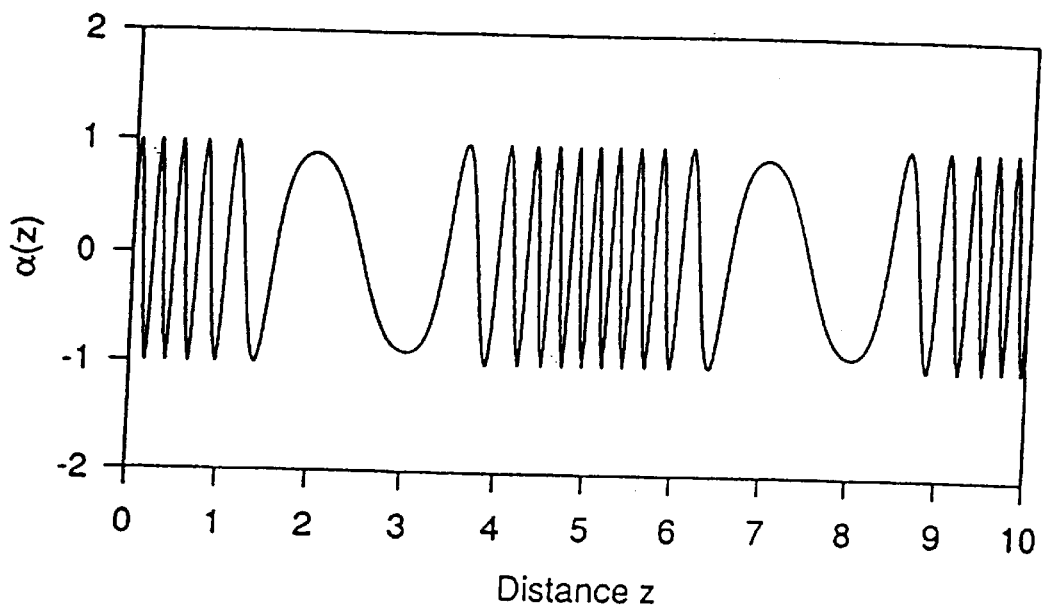
Figure 10B:
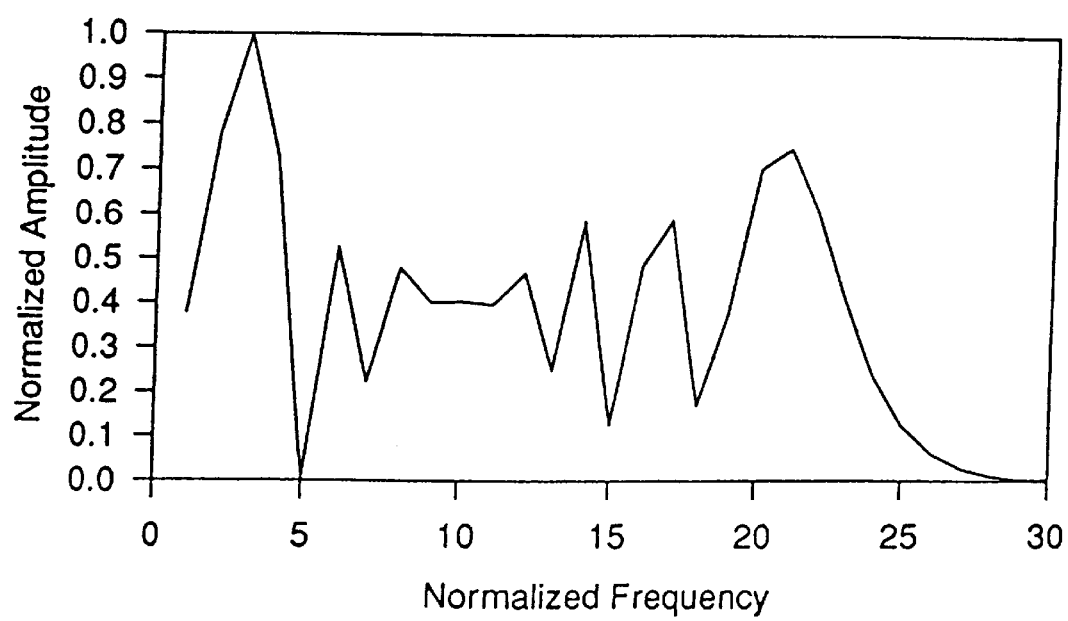

The spin functions of FIGS. 9 and 10 are frequency modulated sinusoidal functions described by equation (8) discussed below. The parameters of this equation used to produce these figures were:

FIG. 9:
$\alpha_0$=1.0 turn/meter,
$f_0$=5.0 meter$^{-1}$,
$f_m$=5.0 meter$^{-1}$,
$\Lambda$=5.0 meter, FIG. 10:
$\alpha_0$=1.0 turn/meter,
$f_0$=2.0 meter$^{-1}$,
$f_m$=2.0 meter$^{-1}$,
$\Lambda$=5.0 meter.

Figure 11A:
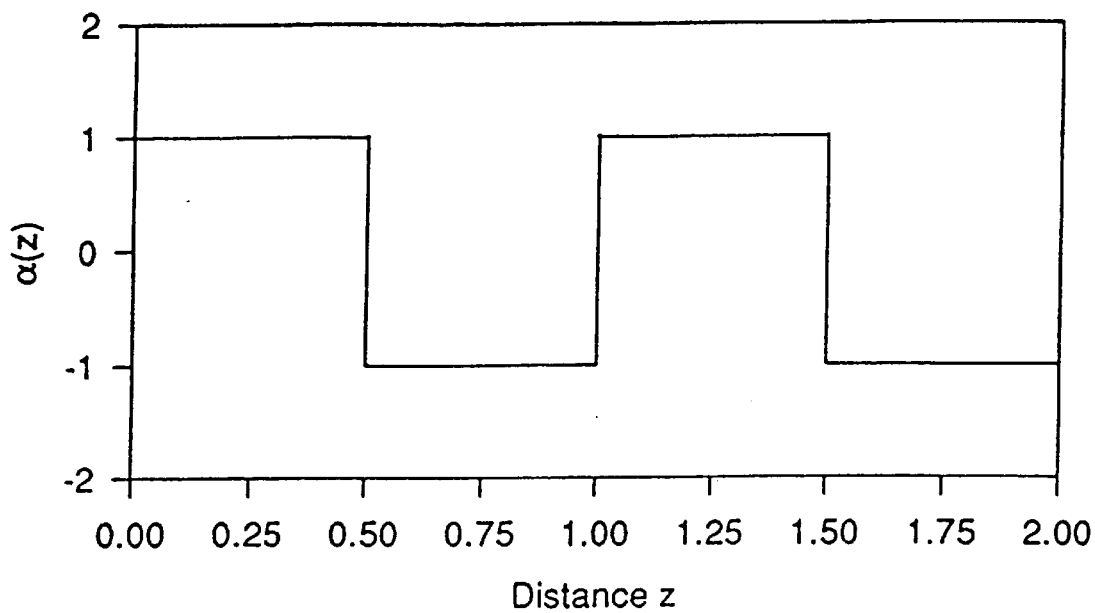
Figure 11B:
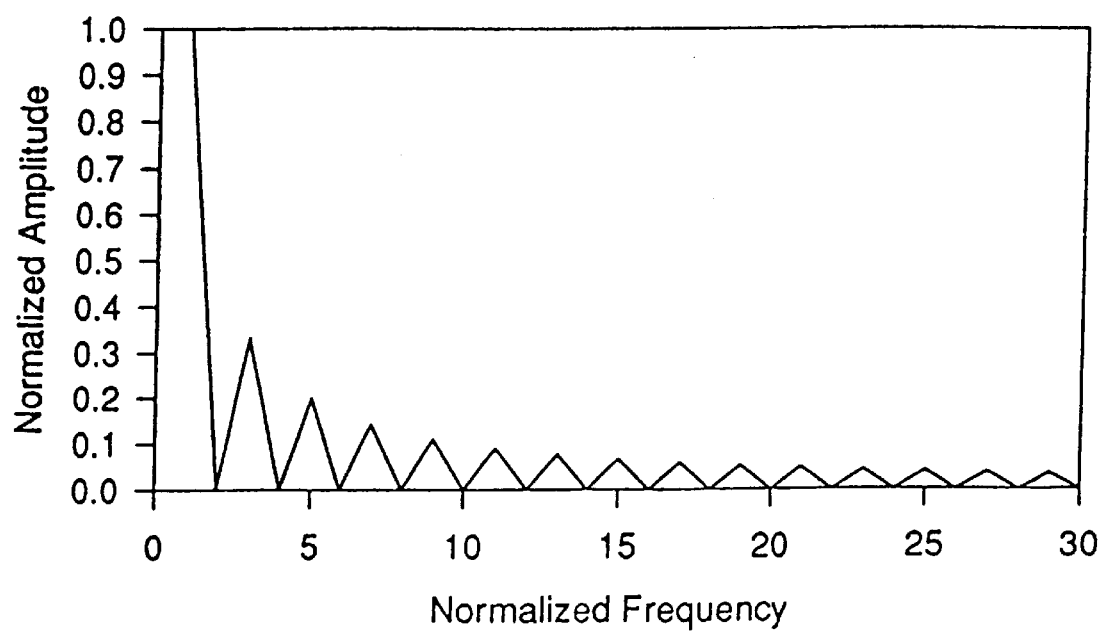
Figure 12A:
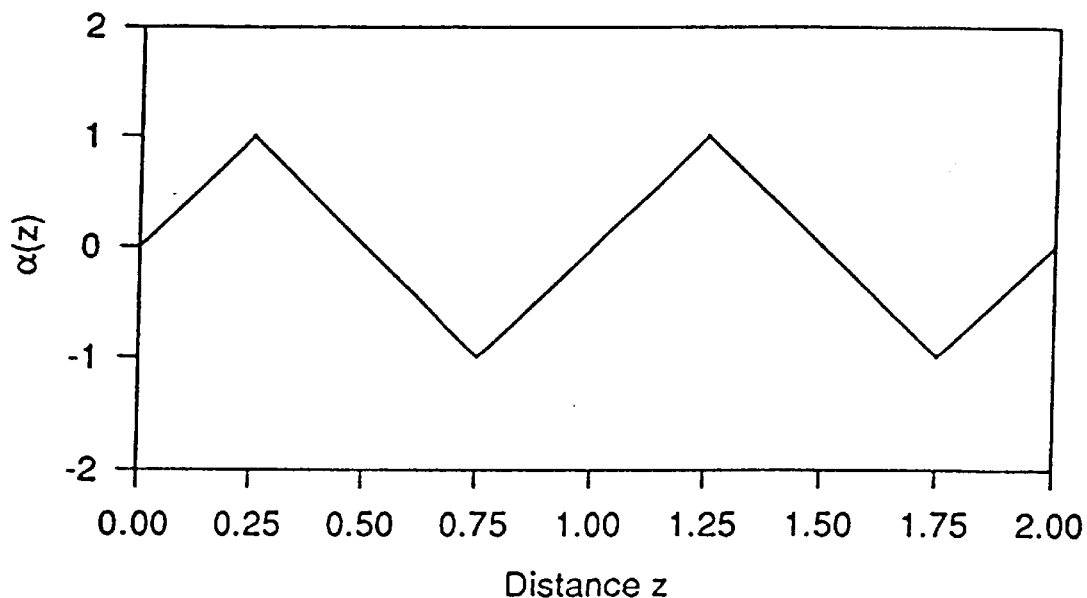
Figure 12B:
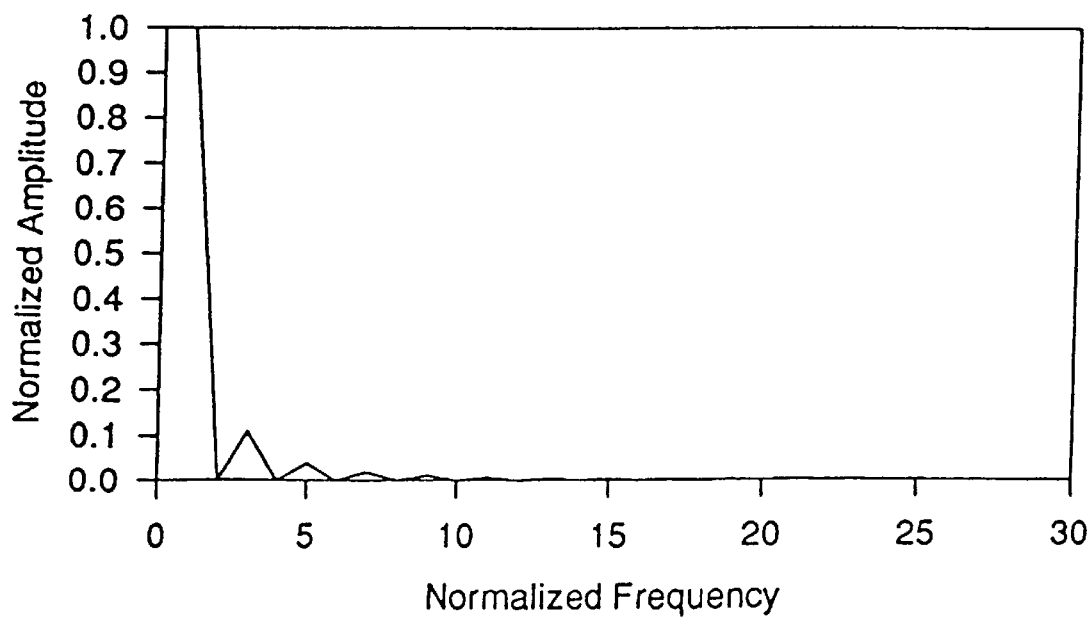

The spin functions of FIG. 11 and FIG. 12 are a square profile and a triangular profile, respectively, with a maximum spin rate and repeat period, in each case, of 1.0 turn/meter and 1.0 meter, respectively.

An examination of the frequency spectra of the square and triangular profiles shows that only a few low frequency components have normalized amplitudes greater than 0.2, with the amplitudes of the higher frequency components being negligible. These profiles are thus similar to a sinusoidal profile in terms of PMD reduction, i.e., in terms of their variability. For the two frequency modulated profiles, on the other hand, there are many frequency components whose normalized amplitudes are higher than 0.2. These frequency components provide the variability needed for optimum PMD reduction for commercial fibers.

The analysis procedure of FIGS. 9–12 can be used to determine whether or not a particular spin function has sufficient variability to provide a substantial reduction in PMD for a plurality of beat lengths. Functions like the frequency modulated profiles have sufficient harmonic content to provide the required variability, while the square and triangular profiles do not. Based on these teachings, a person skilled in the art can readily determine whether any particular spin function which he or she wishes to use will or will not be successful in reducing PMD for a plurality of beat lengths.

As discussed above, in certain of its preferred embodiments, the method of the present invention spins the fiber during the drawing process in accordance with a sinusoidal spin function in which the frequency or amplitude is modulated. A frequency modulated spin function of the invention may be written as:

$$\alpha(z)=\alpha_0 \sin(2\pi[f_0 z + f_m \sin(2\pi z/\Lambda)]), \quad (8)$$

where $\alpha_0$ is the spin amplitude in turns/meter, $f_0$ is the center frequency in inverse meters, $f_m$ is the modulation frequency in inverse meters, z is the position in the fiber, and $\Lambda$ is the modulation period.

For amplitude modulation, the spin function may be written as:

$$\alpha(z)=[\alpha_0 \sin(2\pi z/\Lambda)] \sin(2\pi f z) \quad (9)$$

where $\Lambda$>1/f, f is the spin frequency in inverse meters, and $\alpha_0 \sin(2\pi z/\Lambda)$ represents the modulated amplitude, where $\alpha_0$ is the constant amplitude in turns/meter, and $\Lambda$ is the modulation period in meters.

Both frequency and amplitude modulation can be performed if desired. In so doing, care must be taken that the two modulations do not interact so as to create sections of fiber in which the spin rate is essentially constant. In practice, either frequency modulation or amplitude modulation allows sufficient variability to be introduced into a spin function to achieve a substantial reduction in PMD for a plurality of beat lengths. Accordingly, use of these modulations separately, as opposed to simultaneously, is preferred.

Figure 13:
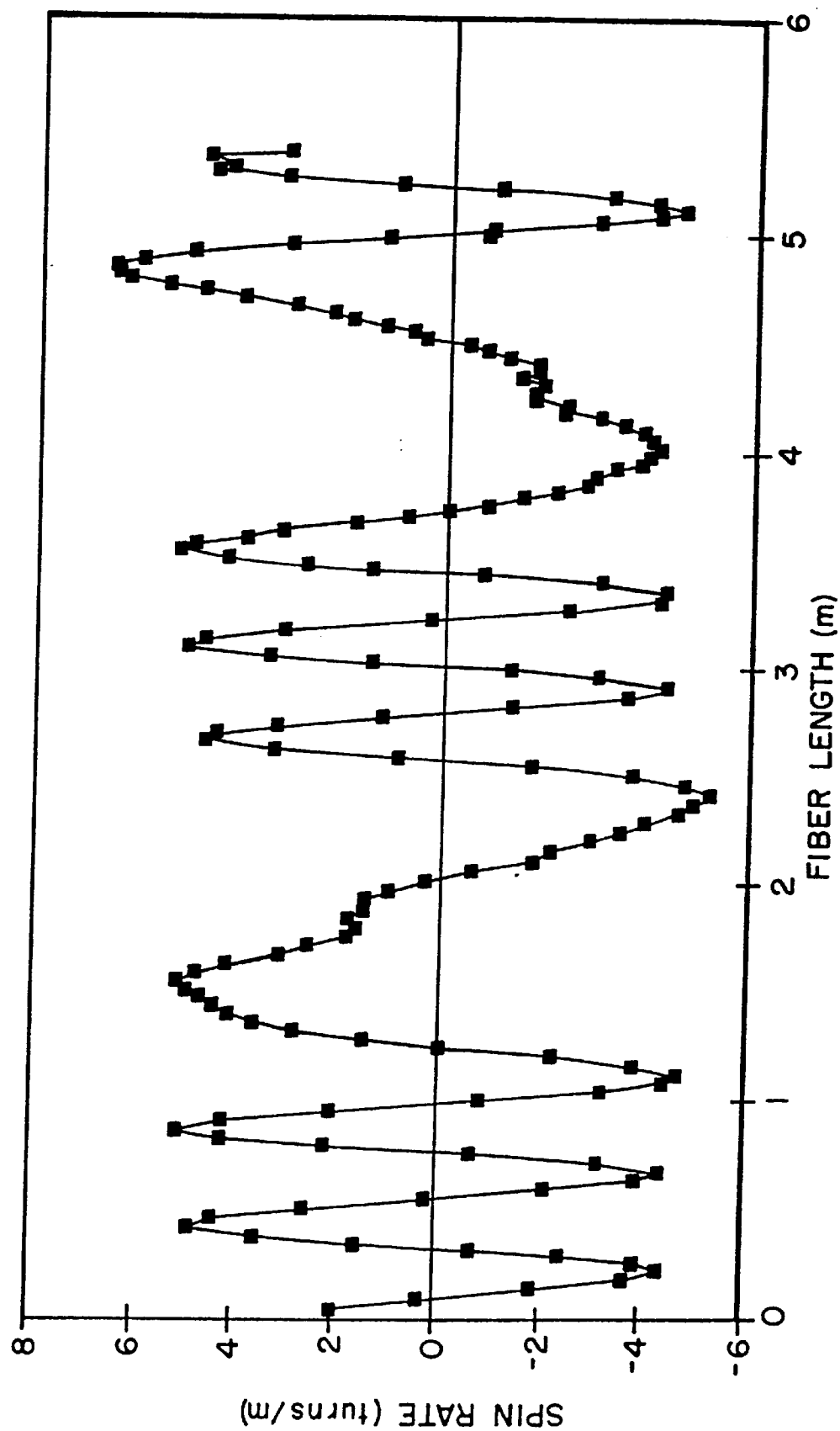
FIG. 13 shows a frequency modulated sinusoidal spin rate as a function of length for a fiber prepared in accordance with the invention.

FIG. 13 illustrates a frequency modulated sinusoidal spin function observed in a fiber prepared in accordance with the invention. Among other features, the spin function of FIG. 13 has multiple maxima (local maxima) which differ from one another in magnitude (compare, for example, the maximum near 5 meters with that near 3 meters). In general, the spin functions of the invention, whether of the frequency modulation type, the amplitude modulation type, or of some other type, e.g., the sum of sinusoids type, are characterized by having at least two maxima which differ from one another in magnitude (spin rate).

Similarly, the derivative of the spin function of FIG. 13 has multiple maxima (local maxima) which differ from one another in magnitude. Again, in general, the spin functions of the invention, whether of the frequency modulation type, the amplitude modulation type, or of some other type, are characterized by this feature.

The plot of FIG. 13, which shows spin rate in turns per meter versus length, illustrates the final result of preparing a fiber in accordance with the invention. It is readily apparent, assuming a constant draw speed and a one-to-one correspondence between an applied spin function and the resulting spin function in the fiber, that the process of the invention, if illustrated by spin rate in turns/sec plotted against time, would result in a complementary curve.

A figure like that of FIG. 13 may be obtained for an amplitude modulated spin function in which the amplitude of the curve varies between a minimum and maximum amplitude, for example, between 0 and 4 turns per meter. Similar curves may be obtained for other spin functions having the high variability of the invention. In each case, complementary curves plotting spin rate in turns/sec versus time can be obtained and will have a complementary shape for a constant draw speed.

As will be evident to those skilled in the art, the spin function which is employed in the practice of the invention involves varying the spin rate of the fiber as a function of time by applying appropriate forces to the fiber and/or the preform. Apparatus for applying such forces is discussed below. The temporal spin function applied to the fiber becomes translated into a spatial spin function in the fiber as the fiber is being drawn. This spatial spin function can be detected in the finished fiber by, for example, examining spaced cross sections through the fiber. See Marrone et al., *Optics Letters*, Vol. 12, pages 60–62, 1987. FIG. 13 was obtained in this way.

Figure 17:
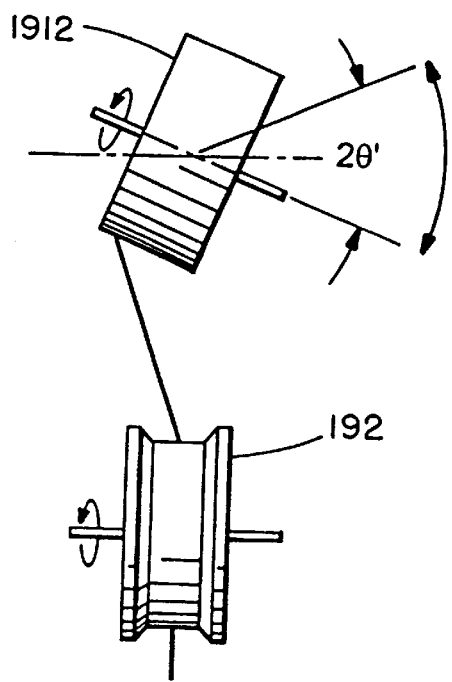
FIG. 17 illustrates apparatus which can be used to produce the spin functions of the invention.

Certain apparatus which can be used to practice the invention, e.g., the apparatus of FIG. 17 discussed below, may not in all circumstances achieve a one-to-one correspondence between the applied spin function and the resulting spin function in the fiber. However, the correspondence is in general good enough to achieve the benefits of the invention and thus, with regard to the method and apparatus aspects of the invention, the claims set forth below are written in terms of the spin function employed during the drawing process even though the relative spin between the fiber and the preform, and thus the spin created within the fiber, may not correspond identically to the applied spin function. The product per se claims are written in terms of the spin function actually observed in the fiber.

The resonant nature of PMD reduction through fiber spinning, as well as the advantages of frequency and amplitude modulation, can be further demonstrated by examining the ratio of the PMD of spun fiber $\tau_s$ to that of unspun fiber $\tau_0$ (hereinafter referred to as the "PMD reduction factor" or the "RF parameter"):

$$RF = \tau_s/\tau_0 \quad (10)$$

Figure 14:
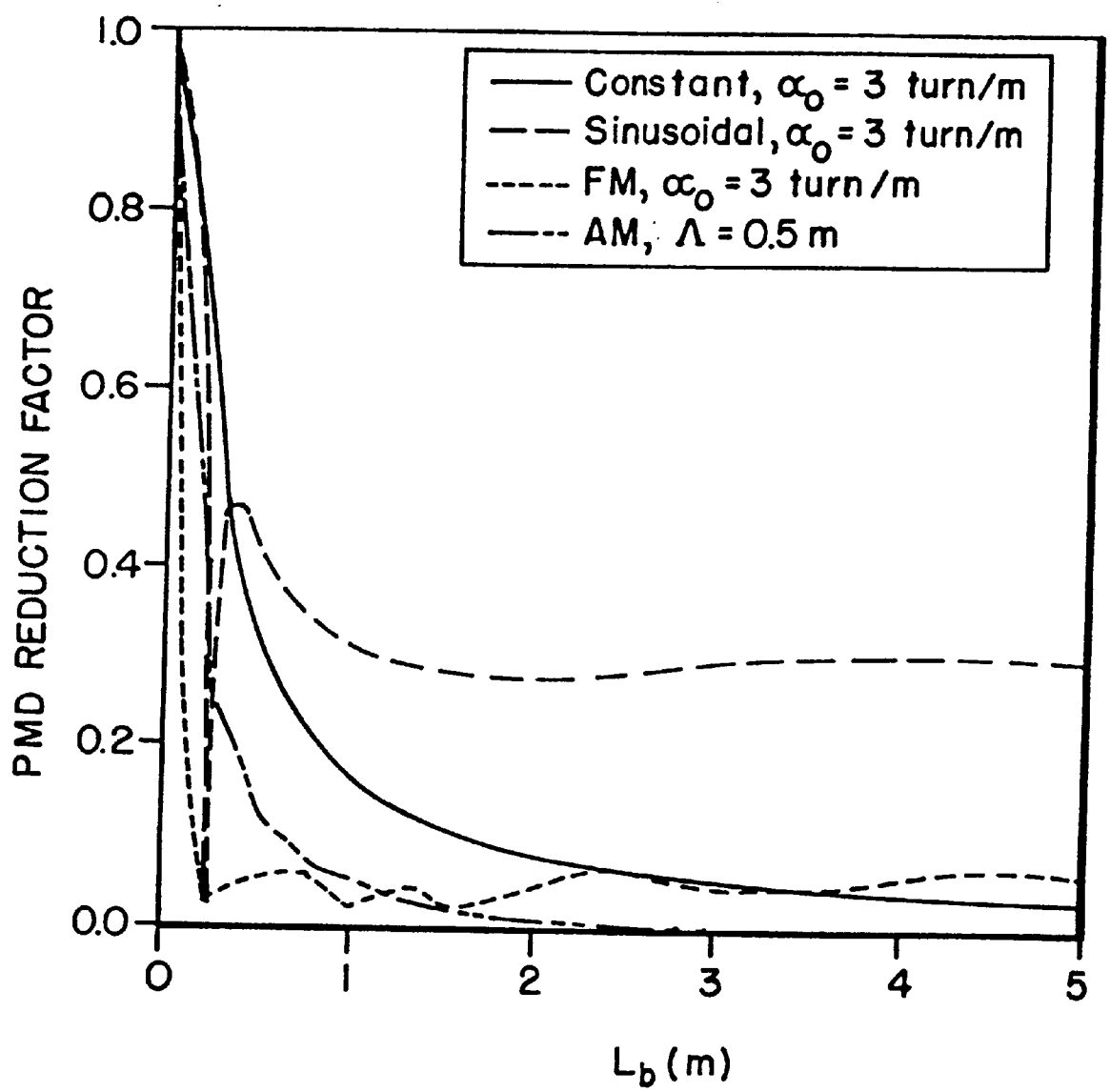
FIG. 14 is a diagram showing PMD reduction as a function of beat length.

FIG. 14 plots the RF parameter as a function of beat length to illustrate the improvement in the reduction of PMD obtained by the methods of the present invention as compared to prior art methods. Specifically, FIG. 14 plots RF as a function of beat length for four spin functions: (1) a constant spin function of the prior art, where $\alpha_0=3$ turns/meter (illustrated by a solid line); (2) a sinusoidal spin function of the prior art, where $\alpha_0=3$ turns/meter and f is 2 meter$^{-1}$ (illustrated by a dashed line); (3) a frequency modulated sinusoidal spin function of the present invention (illustrated by a dotted line); and (4) an amplitude modulated sinusoidal spin function of the present invention (illustrated by a dashed and dotted line).

The parameters for the frequency modulated sinusoidal spin function were as follows:

$\alpha_0=3.0$ turns/meter,
$f_0=4.0$ meter$^{-1}$,
$f_m=5.0$ meter$^{-1}$,
$\Lambda=5.0$ meter.

The parameters for the amplitude modulated sinusoidal spin function were as follows:

$\alpha_0=5.0$ turns/meter,
$f=0.1$ meter$^{-1}$,
$\Lambda=0.5$ meters.

As can be seen in FIG. 14, the frequency modulated spin function exhibited a PMD reduction factor of less than 0.1 at a beat length of approximately a quarter of meter. The amplitude modulated spin function achieved the same level of PMD reduction at a beat length of approximately three-quarters of a meter. By contrast, the constant spin function did not obtain a PMD reduction factor of less than 0.1 until the beat length was approximately 2 meters, and the sinusoidal spin function, while obtaining a very low PMD reduction factor at a beat length of approximately a quarter of a meter, did not maintain this PMD reduction for longer beat lengths, having a PMD reduction factor of only about 0.3 for all beat lengths above a quarter of a meter.

Plainly, the modulated sinusoidal spin functions of the invention were better than the prior art in achieving low levels of PMD for a variety of beat lengths, as is desired. As indicated above, this improvement is based on the recognition that occurrences of maximal PMD reduction for sinusoidal-type spin functions depend upon three parameters: (1) spin amplitude; (2) spin period (frequency); and (3) fiber beat length. Since the spin functions of prior art methods have substantially fixed periods and amplitudes, these spin function are capable of reducing PMD only for a small number of beat lengths. The present invention, in its preferred embodiments, varies the amplitude or the frequency of the spin function, and thus allows PMD reduction over a greater number of beat lengths.

Figure 15:
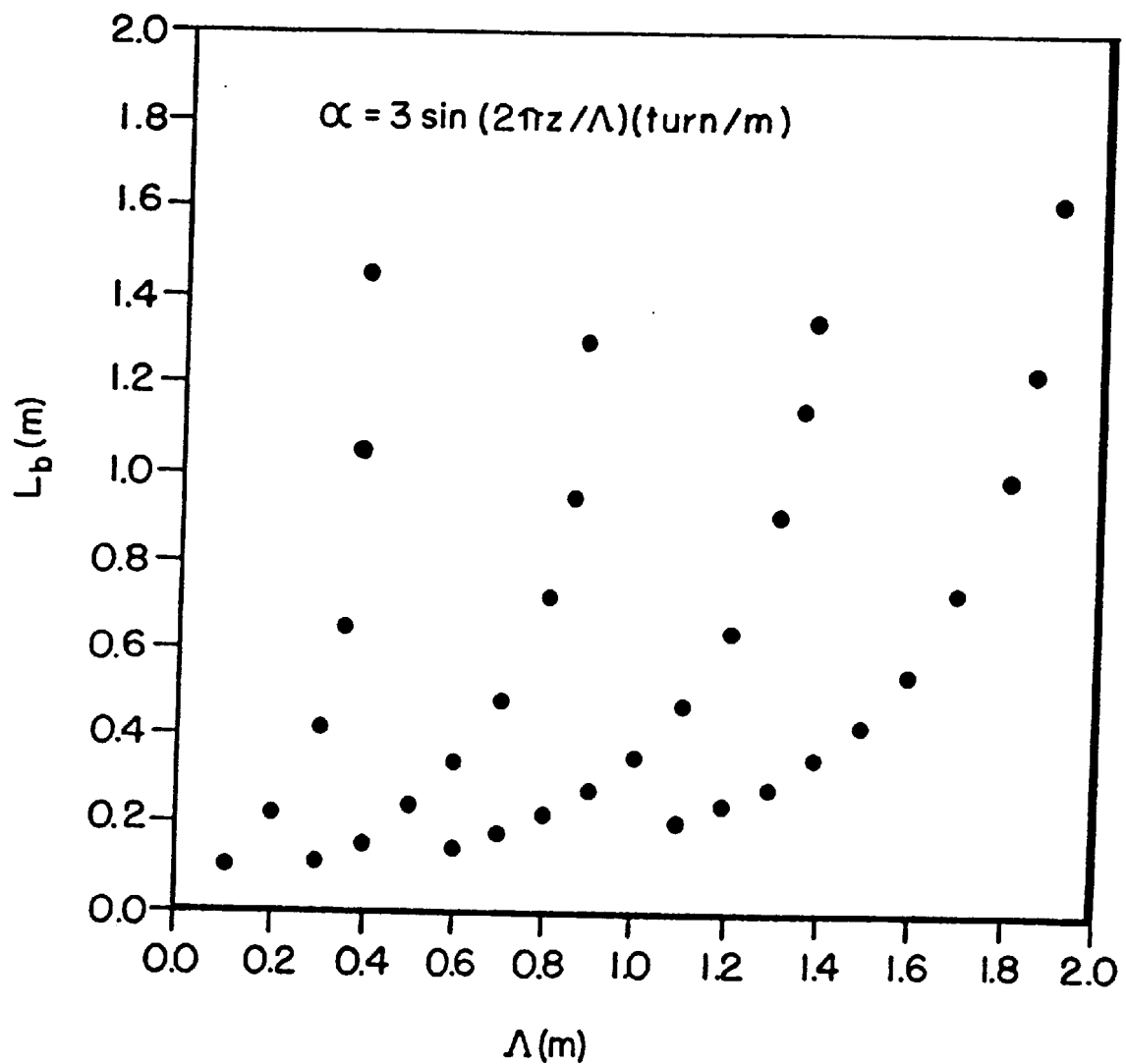
FIG. 15 is a diagram illustrating the occurrences of maximal PMD reduction for a frequency-modulated spin function.
Figure 16:
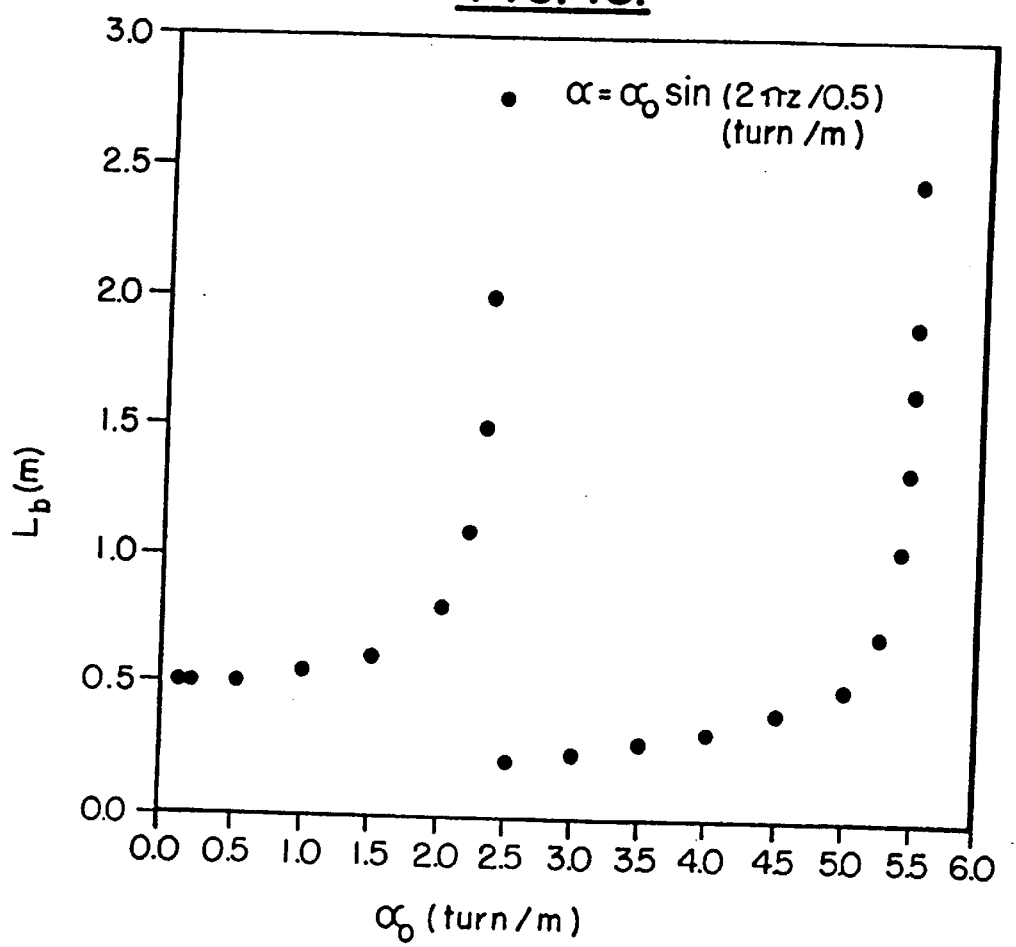
FIG. 16 is a diagram illustrating the occurrences of maximal PMD reduction for an amplitude-modulated spin function.

These effects are further illustrated by FIGS. 15 and 16. When a fiber is spun during the drawing process in accordance with a sinusoidal spin function having a fixed amplitude, maximal PMD reductions occur at various beat lengths depending upon the frequency of the spin function. FIG. 15 is a plot of these occurrences, shown as dots, for a fiber spun in accordance with a spin function of $\alpha=3 \sin(2\pi z/\Lambda)$ turns/meter, where the period $\Lambda$ of the spin function (which is the reciprocal of the spin frequency) is modulated between 0 and 2 meters.

To achieve a maximal PMD reduction, one needs to spin the fiber at a frequency which corresponds to a dot. The locations of the dots, however, depend upon the fiber's beat length and, in general, the beat length of a commercial fiber is not known with high precision in advance. Because the sinusoidal spin functions of prior art methods have substantially fixed amplitudes and frequencies, only a limited number of "matches" with dots are possible. It follows that substantial PMD reduction is limited to a small number of beat lengths, as is illustrated by the dashed line (pure sinusoidal line) in FIG. 14.

By contrast, the methods of the present invention take advantage of these occurrences of maximal PMD reduction by, for example, modulating the frequency of the spin function. This allows a greater number of "matches" with the dots of FIG. 15. At each frequency where matching takes place, there is substantial PMD reduction at the corresponding beat lengths. This allows substantial PMD reduction over a large number of beat lengths, as is illustrated by the dotted line (frequency modulated line) in FIG. 14.

A similar analysis may be made for an amplitude modulated spin function. FIG. 16 illustrates occurrences of maximal PMD reduction at various beat lengths as a function of the amplitude of the spin function for a spin function defined by:

$$\alpha = \alpha_0 \sin(2\pi z/0.5) \qquad (11)$$

where $\alpha_0$, the amplitude of the spin function, is modulated between 0 and 6 turns/meter. As in FIG. 15, the occurrences of maximal PMD reduction are shown by dots.

When the amplitude of the spin function "matches" the amplitude at which there exists an occurrence of maximal PMD reduction, the PMD is substantially reduced at the corresponding beat lengths. Because the sinusoidal spin functions of prior art methods have substantially fixed amplitudes and frequencies, only a limited number of "matches" are possible. It follows that substantial PMD reduction is limited to a small number of beat lengths, as is illustrated by the dashed line (pure sinusoidal line) in FIG. 14.

By contrast, the methods of the present invention take advantage of these occurrences of maximal PMD reduction by modulating the amplitude of the spin function. This allows a greater number of "matches" with the amplitudes at which there are occurrences of maximal PMD reduction. At each of these amplitudes where matching takes place, there is substantial PMD reduction at the corresponding beat lengths. This allows substantial PMD reduction over a large number of beat lengths, as is illustrated by the dotted and dashed line (amplitude modulated line) in FIG. 14.

Any apparatus which is capable of spinning the fiber during the fiber drawing process and is also capable of varying the frequency and/or amplitude of the spin may be used to carry out the methods of the present invention. FIG. 17 is a reproduction of FIG. 4 of the above-referenced Hart patent, where rollers 1912 and 192 are part of the guide mechanism of a draw tower. The Hart patent describes producing the spin functions of Hart's FIG. 6 by sinusoidally oscillating the axis of roller 1912 through angle 2θ', the oscillation of the axis producing a spin in the fiber as a result of dynamic friction between the fiber's outer surface and the surface of the roller. As described above, Hart's spin functions have insufficient variability to achieve the benefits of the present invention.

The present invention can be practiced using apparatus of the type shown in the Hart patent by varying θ' as a function of time while holding the frequency of oscillation constant to achieve amplitude modulation or by holding θ' constant and varying the frequency of oscillation as a function of time to achieve frequency modulation. Other spin functions which follow the teachings of the invention can be practice in an analogous manner.

Apparatus other than that shown in FIG. 17, e.g., the other types of spinning mechanisms discussed in the Hart patent or similar apparatus now known or subsequently developed in the art, can be used in the practice of the invention. See, for example, Arditty et al., U.S. Pat. No. 4,509,968, which describes apparatus for rotating a fiber about its axis as it is being formed. See also commonly assigned and copending U.S. applications Ser. Nos. 60/012,290 (filed Feb. 26, 1996 in the name of Robert M. Hawk) and 60/015,298 (filed Apr. 12, 1996 in the names of Robert M. Hawk, Paul E. Blaszyk, William R. Christoff, Dan E. Gallagher, William J. Kiefer, Danny L. Henderson, Ming-Jun Li, Daniel A. Nolan, and Glenda R. Washburn), which are entitled "Method and Apparatus for Providing Controlled Spin in Optical Fiber" and "Method and Apparatus for Introducing Controlled Spin in Optical Fibers", respectively. In general terms, the spinning apparatus, however constructed, will include fiber-contacting means for applying a spinning force to a fiber, e.g., a roller, and drive means for moving the fiber-contacting means in a non-sinusoidal spatial pattern as a function of time, e.g., a computer-controlled drive motor and associated mechanical linkage for defining the motion of the fiber-contacting means.

Additional mechanisms for practicing the methods of the invention will be evident to persons skilled in the art from the disclosure herein, e.g., mechanisms for non-sinusoidal spinning of a preform, when such preform spinning is used alone or in combination with applying a spinning force to a fiber. See, for example, PCT Patent Publication No. 83/00232 referred to above.

The foregoing sets forth improved methods and apparatus for reducing PMD. Although particular illustrative embodiments have been disclosed, persons skilled in the art will appreciate that the present invention can be practiced by other than the disclosed embodiments, which are presented for purposes of illustration, and not of limitation, and the present invention is limited only by the claims that follow.

What is claimed is:

1. A single mode optical fiber having a longitudinal axis and a spin function which is observable in the fiber and which for at least a portion of the fiber varies as a function of distance along said axis such that the spin function: (i) is not substantially sinusoidal; and (ii) has sufficient variability to provide a reduction in polarization mode dispersion for a plurality of beat lengths.

2. A single mode optical fiber having a longitudinal axis and a spin function which is observable in the fiber and which for at least a portion of the fiber varies as a function of distance along said axis such that the spin function: (i) is not substantially sinusoidal; and (ii) has at least two maxima which differ from one another in magnitude.

3. A single mode optical fiber having a longitudinal axis and a spin function which is observable in the fiber and which for at least a portion of the fiber varies as a function of distance z along said axis such that the spin function: (i) is not substantially sinusoidal; and (ii) has a derivative with respect to z which has at least two maxima which differ from one another in magnitude.

4. A single mode optical fiber having a longitudinal axis and a spin function which is observable in the fiber and which for at least a portion of the fiber varies as a function of distance along said axis such that the spin function is a frequency modulated sinusoidal function.

5. A single mode optical fiber having a longitudinal axis and a spin function which is observable in the fiber and which for at least a portion of the fiber varies as a function of distance along said axis such that the spin function is an amplitude modulated sinusoidal function.

6. A single mode optical fiber having a longitudinal axis and a spin function which is observable in the fiber and which for at least a portion of the fiber varies as a function of distance along said axis such that the spin function has a frequency spectrum which comprises at least three components which have normalized amplitudes of at least 0.2.

7. The single mode optical fiber of claim 6 wherein the frequency spectrum comprises at least five components which have normalized amplitudes of at least 0.2.

8. The single mode optical fiber of claim 6 wherein the frequency spectrum comprises at least ten components which have normalized amplitudes of at least 0.2.

9. The single mode optical fiber of claim 1, 2, 3, 4, 5, or 6 wherein the fiber exhibits reduced polarization mode dispersion in comparison to a corresponding fiber which is unspun.

10. The single mode optical fiber of claim 1, 2, 3, 4, 5, or 6 wherein the fiber has a polarization reduction factor which is less than 0.2 for beat lengths between 1.0 and 2.0 meters.

11. The single mode optical fiber of claim 1, 2, 3, 4, 5, or 6 wherein the maximum amplitude of the spin function is less than 10 turns/meter.

12. The single mode optical fiber of claim 1, 2, 3, 4, 5, or 6 wherein the maximum amplitude of the spin function is less than 4 turns/meter.

* * * * *

UNITED STATES PATENT AND TRADEMARK OFFICE
CERTIFICATE OF CORRECTION

PATENT NO. : 5,943,466        Page 1 of 1
DATED : August 24, 1999
INVENTOR(S) : Danny L. Henderson; Ming-Jun Li; Daniel A. Nolan; Glenda Washburn It is certified that error appears in the above-identified patent and that said Letters Patent is hereby corrected as shown below:

<u>Column 2,</u>
Line 50, change "a" to "$\alpha$"

<u>Column 7,</u>
Equations 5 and 6, change "cos(ad)" to "cos ($\alpha$d)"
Line 19, change "a" to "$\alpha$"

<u>Column 10,</u>
Line 58, change "A" to "$\Lambda$"

Signed and Sealed this

Twenty-first Day of August, 2001

*Attest:*

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.  : 5,943,466  
DATED       : August 24, 1999  
INVENTOR(S) : Danny L. Henderson; Ming-Jun Li; Daniel A. Nolan; Glenda Washburn Page 1 of 1

It is certified that error appears in the above-identified patent and that said Letters Patent is hereby corrected as shown below:

Column 10,
Line 58, change "A" to -- $\Lambda$ --

Column 12,
Line 39, insert "z" after "distance" and before "along"

Claim 2,
Line 43, should read:
  "The single mode optical fiber of Claim 1 the spin function has at least two maxima which differ from one another in magnitude."

Claim 3,
Line 49, should read:
  "The single mode optical fiber of claim 1 wherein the spin function has a derivative with respect to z which has at least two maxima which differ from one another in magnitude."

Signed and Sealed this

Twentieth Day of November, 2001

*Attest:*

NICHOLAS P. GODICI
*Attesting Officer*  *Acting Director of the United States Patent and Trademark Office*